Sept. 22, 1931. J. J. McCABE 1,824,559
LENS SURFACING MACHINE
Filed Feb. 26, 1927 10 Sheets-Sheet 1

INVENTOR
Joseph J. McCabe
BY
Crumpton & Griffith
his ATTORNEYS

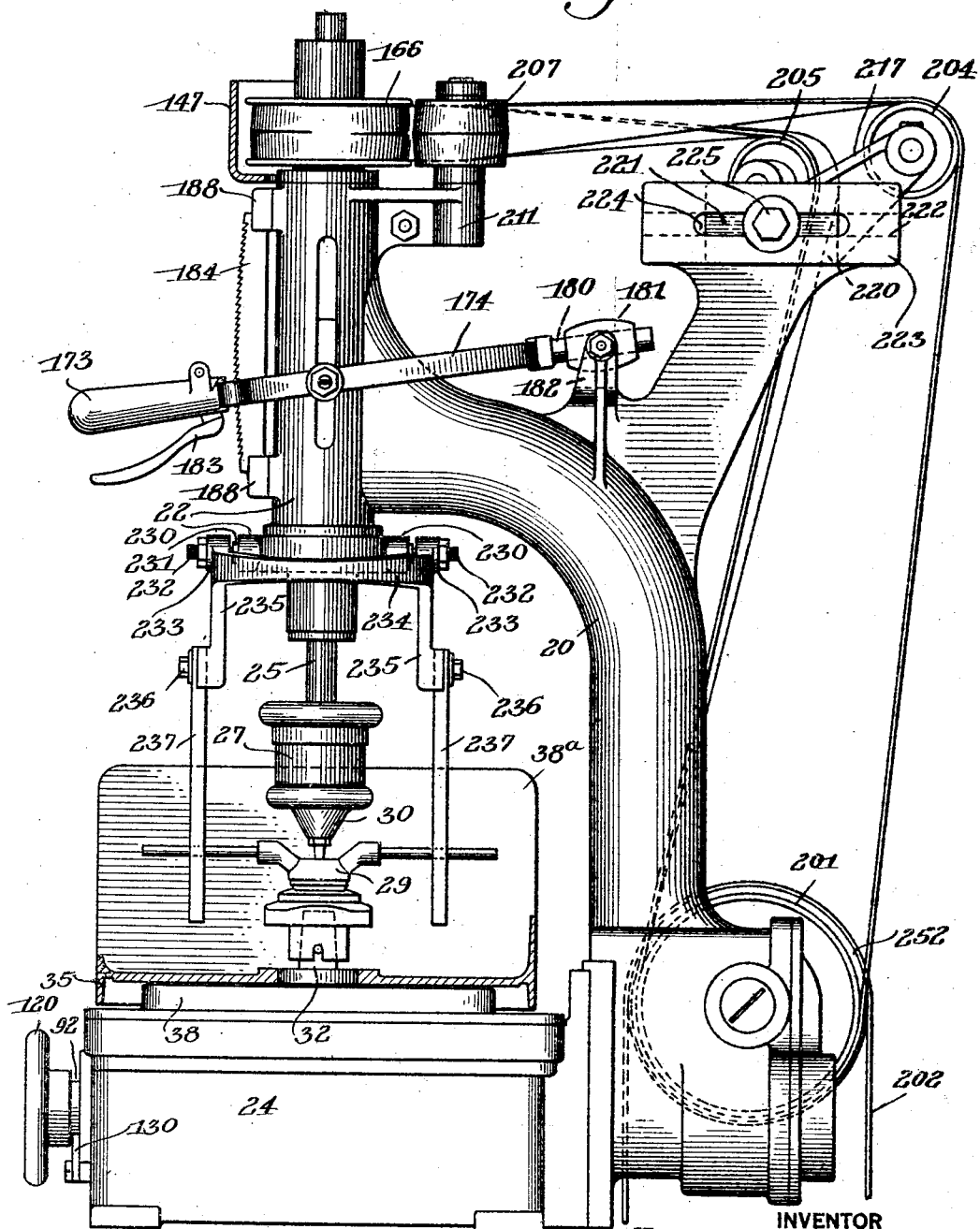

Sept. 22, 1931.  J. J. McCABE  1,824,559
LENS SURFACING MACHINE
Filed Feb. 26, 1927  10 Sheets-Sheet 3
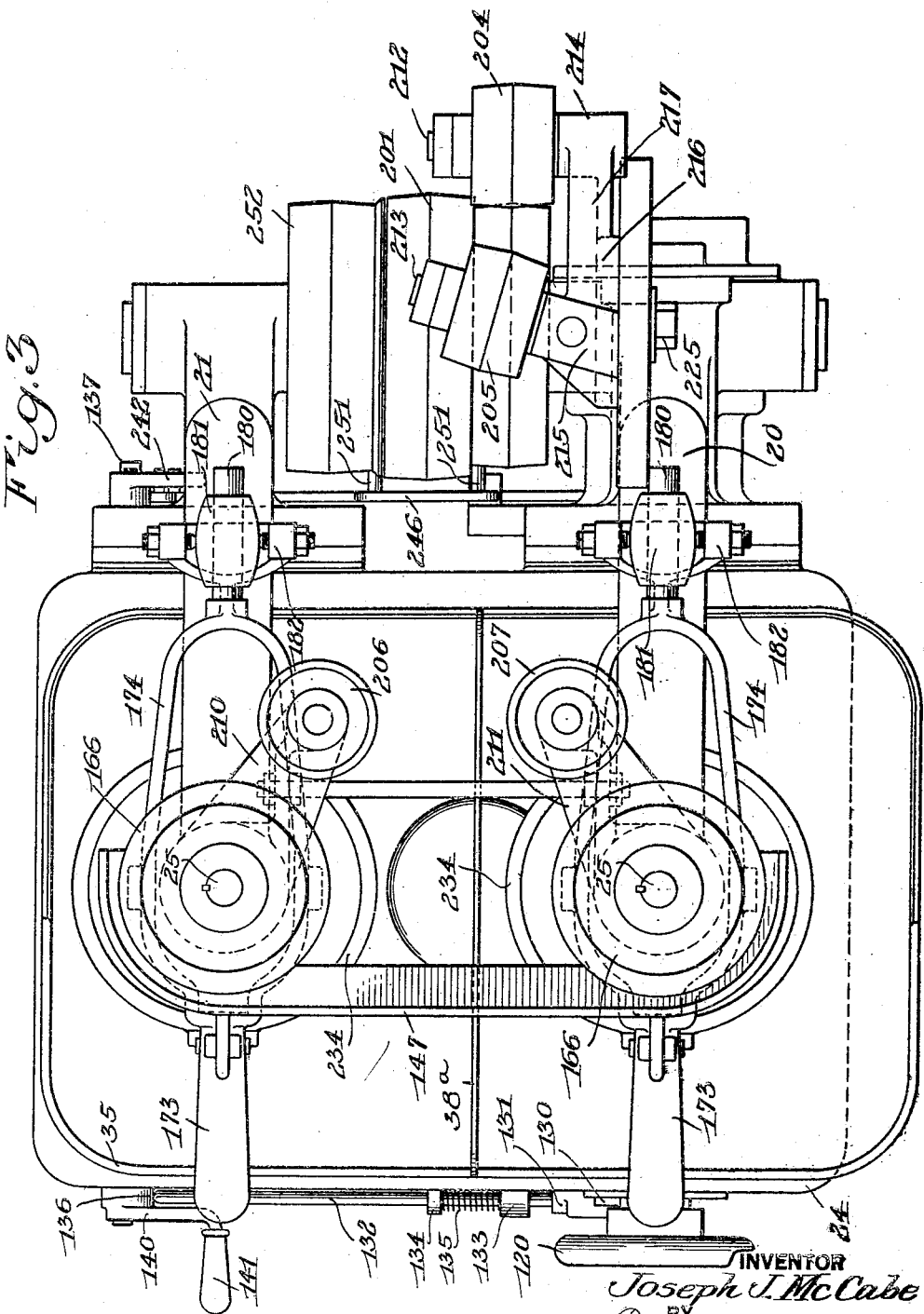
INVENTOR
Joseph J. McCabe
BY
his ATTORNEYS

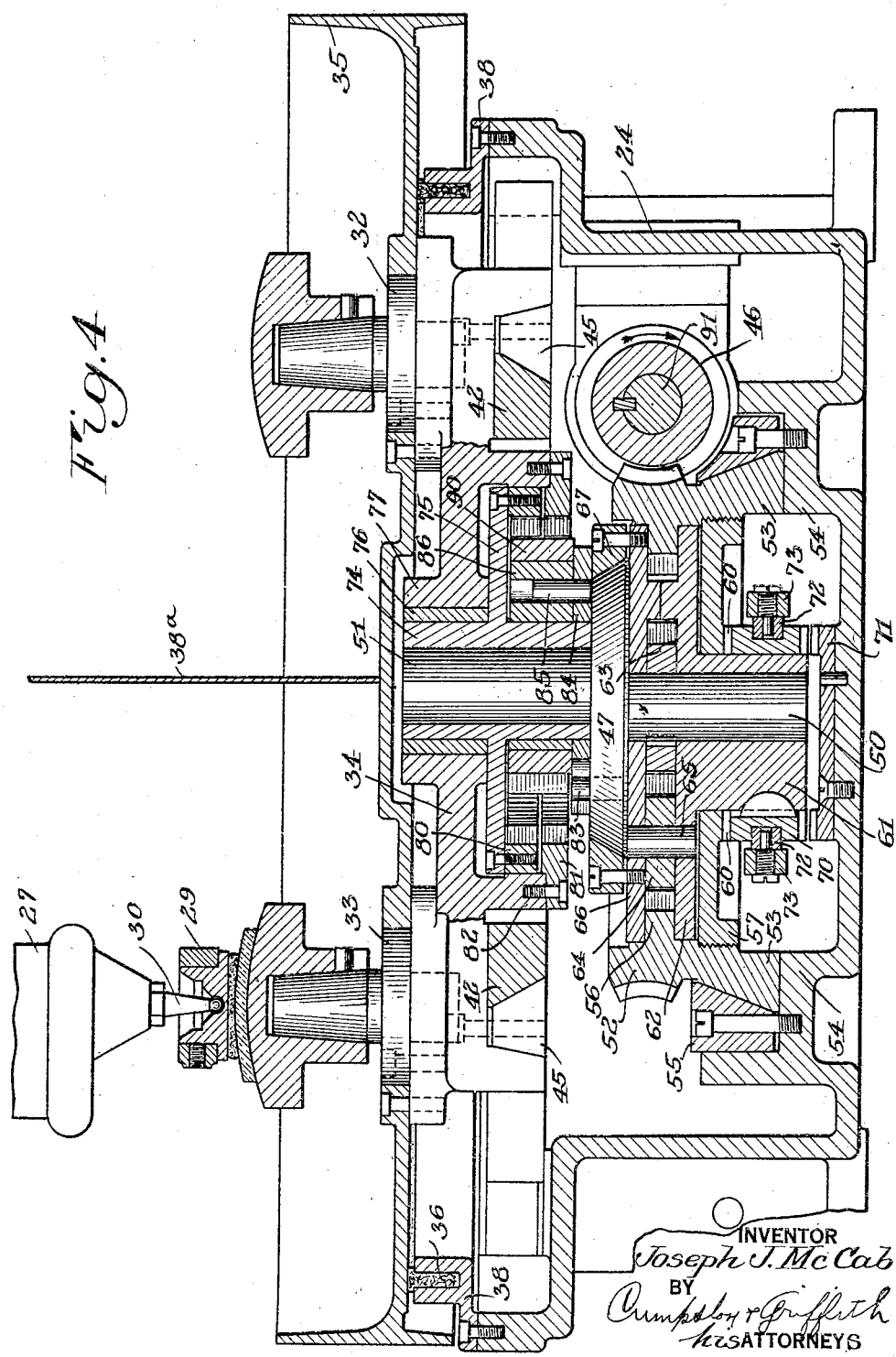

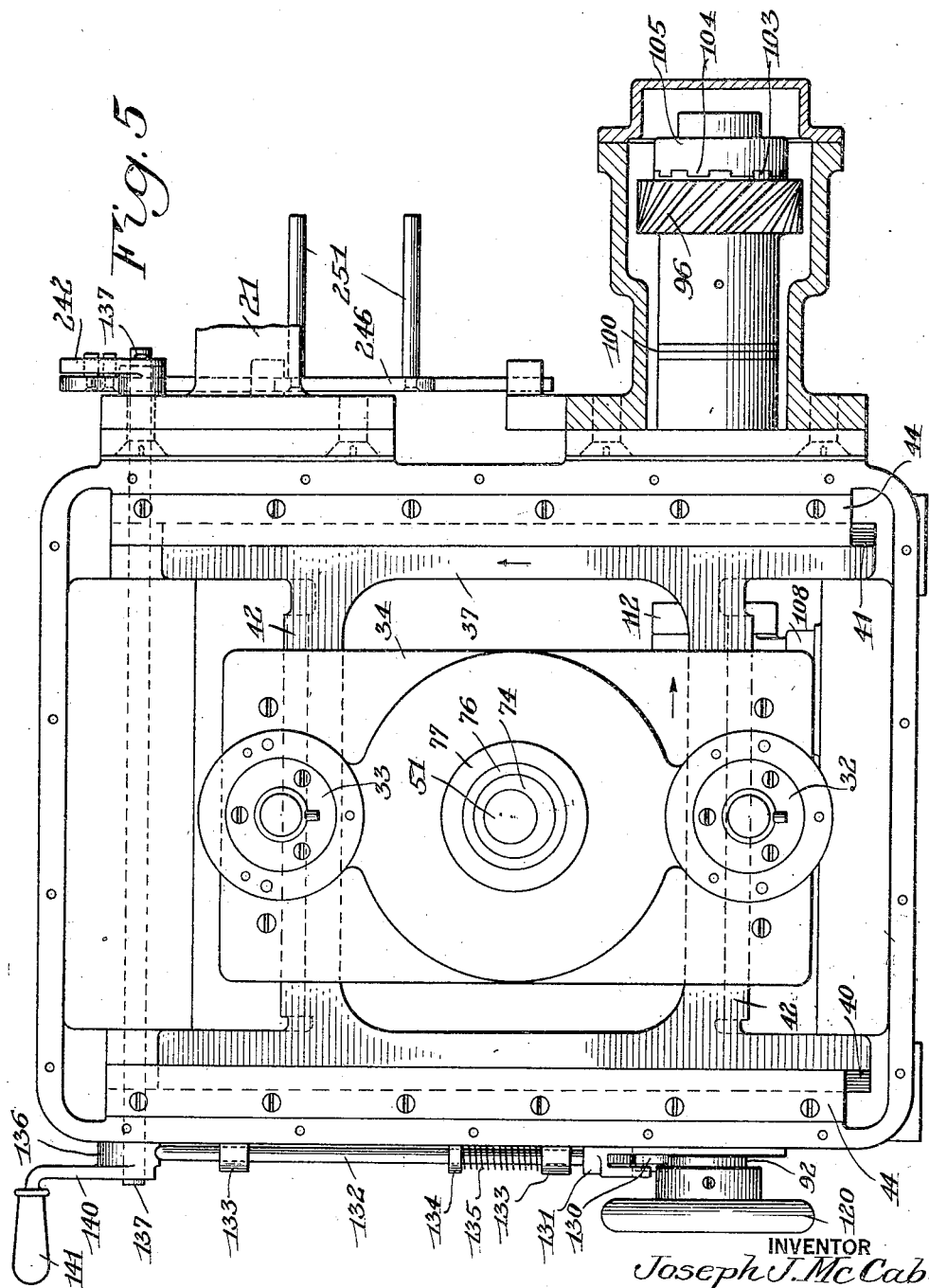

Sept. 22, 1931.     J. J. McCABE     1,824,559
LENS SURFACING MACHINE
Filed Feb. 26, 1927     10 Sheets-Sheet 6

INVENTOR
Joseph J. McCabe
BY Crumpsley & Griffith
his ATTORNEYS

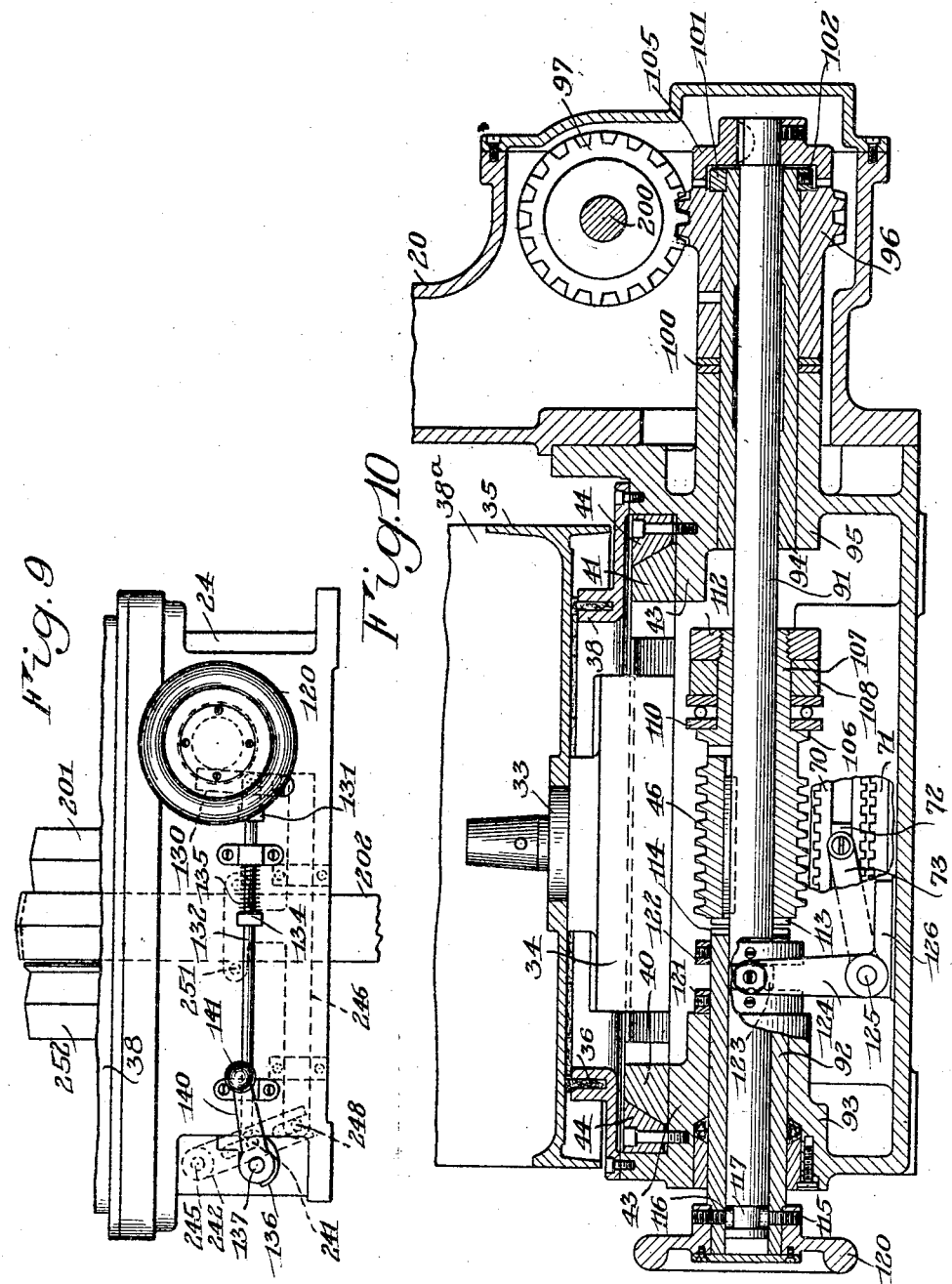

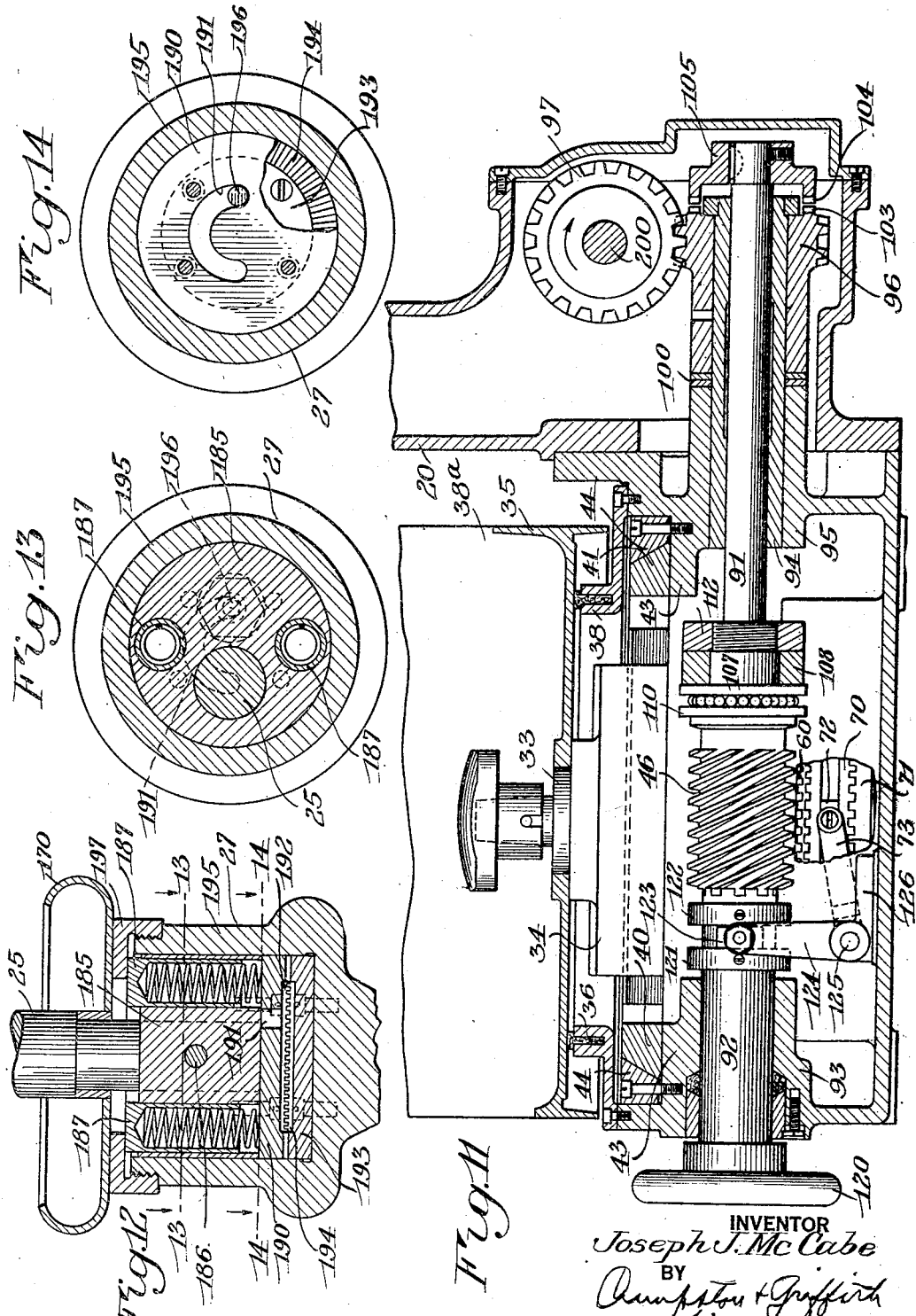

Sept. 22, 1931.  J. J. McCABE  1,824,559
LENS SURFACING MACHINE
Filed Feb. 26, 1927    10 Sheets-Sheet 9
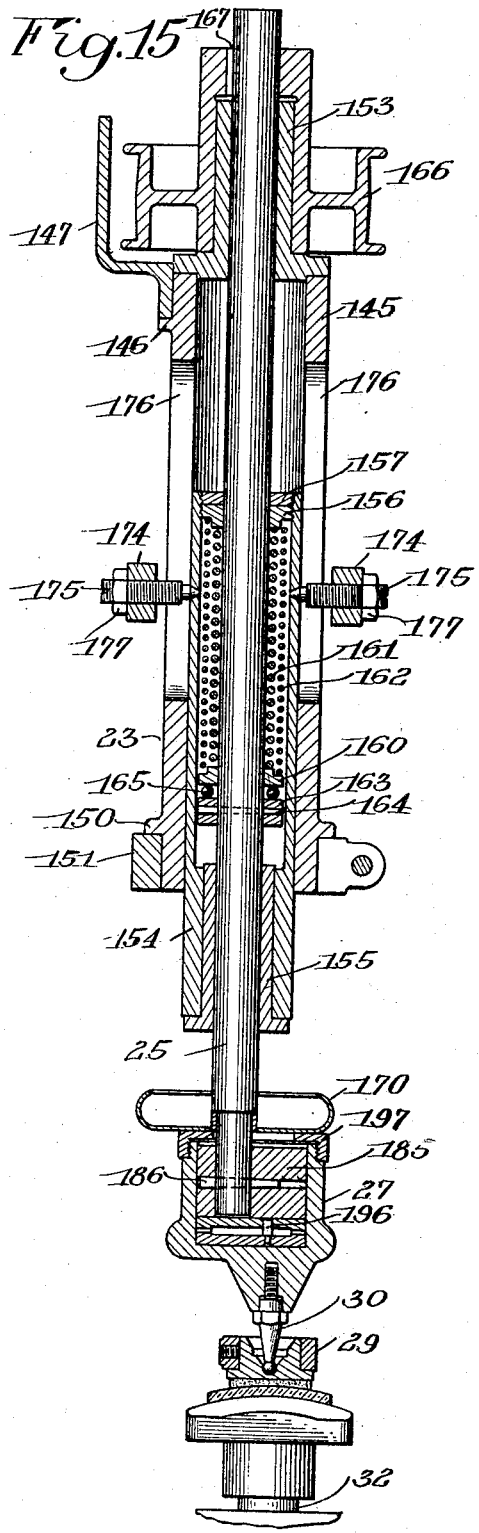
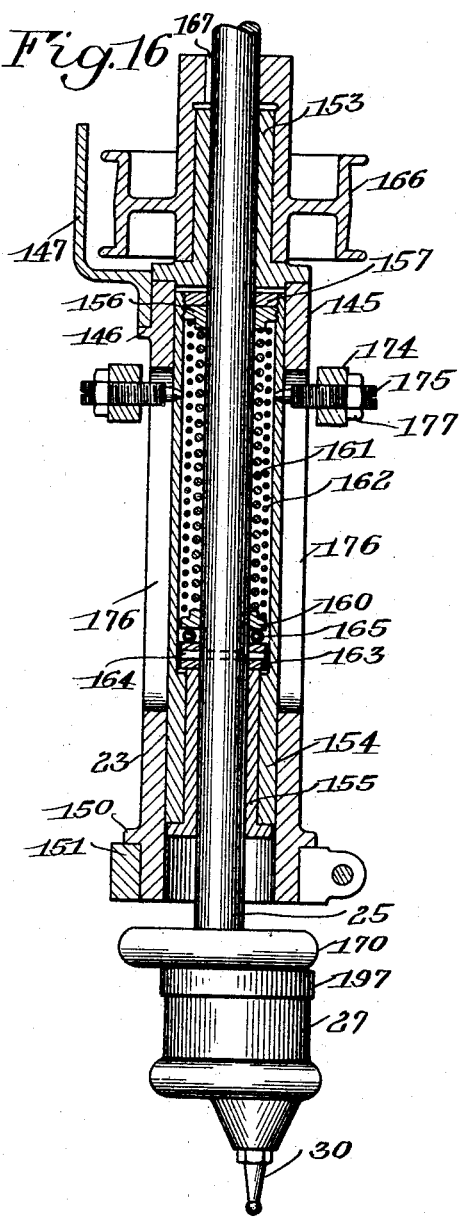
INVENTOR
Joseph J. McCabe
BY
HIS ATTORNEYS Sept. 22, 1931.  J. J. McCABE  1,824,559
LENS SURFACING MACHINE
Filed Feb. 26, 1927   10 Sheets-Sheet 10
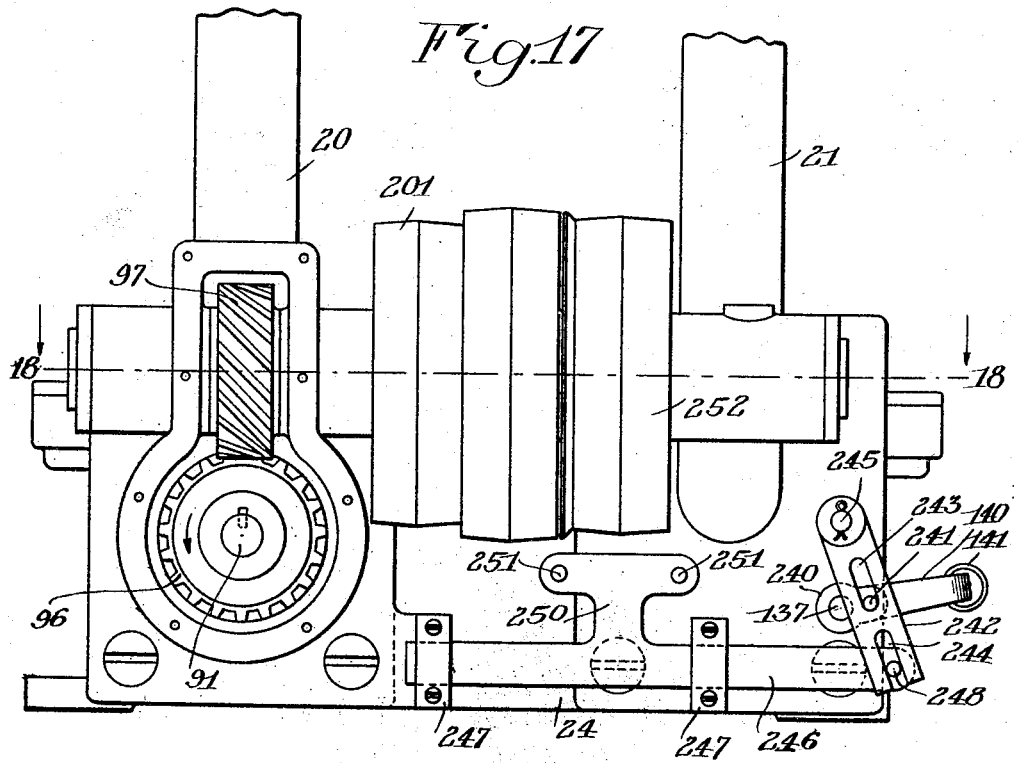
INVENTOR
Joseph J. McCabe
BY
his ATTORNEYS Patented Sept. 22, 1931

1,824,559

UNITED STATES PATENT OFFICE

JOSEPH J. McCABE, OF ROCHESTER, NEW YORK, ASSIGNOR TO BAUSCH & LOMB OPTICAL COMPANY, OF ROCHESTER, NEW YORK, A CORPORATION OF NEW YORK

LENS SURFACING MACHINE

Application filed February 26, 1927. Serial No. 171,310.

This invention relates to lens surfacing machines and particularly to machines for forming and polishing lenses.

An object of this invention is to provide a simple, durable and efficient machine for surfacing lenses. Another object is to provide improved means for causing thoroughly efficient relative movement of the lens and the polishing or abrading surface. Another object is to provide improved means for moving the lap through a constantly changing curved path. Another object is to provide improved manually controlled means for changing the path of travel of the lap. Another object is to provide improved means for maintaining a substantially uniform pressure of the lens against the tool. Another object is to provide improved means for controlling the travel of the lens block.

Other objects will be in part obvious or in part pointed out hereinafter.

The invention accordingly consists in the features of construction, combinations of elements and arrangements of parts as will be exemplified in the structure to be hereinafter described and the scope of the application of which will be pointed out in the following claims.

In the drawings in which there is shown one of the various possible embodiments of this invention, Figure 1 is a front elevation of the lens surfacing machine with certain parts broken away;

Figure 2 is a side elevation of the lens surfacing machine, showing the tray member in section;

Figure 3 is a plan view of the lens surfacing machine;

Figure 4 is a longitudinal sectional elevation of the base showing the mechanism for actuating the lap members;

Figure 5 is a plan view of the base with the tray member removed;

Figure 9 is a front view of the base showing a portion of the belt shifting mechanism and a portion of the mechanism for altering the path of travel of the lap;

Figure 10 is a transverse sectional elevation of the base showing the means for rendering the lap actuating mechanism inoperative to permit adjustment of the lap travel;

Figure 11 is a view similar to Figure 10 showing various parts in different positions;

Figure 12 is a sectional view of a portion of the cam member which directs the travel of the lens block;

Figure 13 is a sectional plan view taken substantially on line 13—13 of Figure 12;

Figure 14 is a sectional plan view taken substantially on line 14—14 of Figure 12;

Figures 15 and 16 are sectional elevations of the head member showing the spindle in two positions.

Figure 17 is a rear elevation of the base member showing the driving pulleys attached thereto, and a portion of the belt shifting mechanism; and Figure 18 is a sectional plan view taken substantially on line 18—18 of Figure 17.

Similar reference characters refer to similar parts throughout the several views of the drawings.

Figure 1:
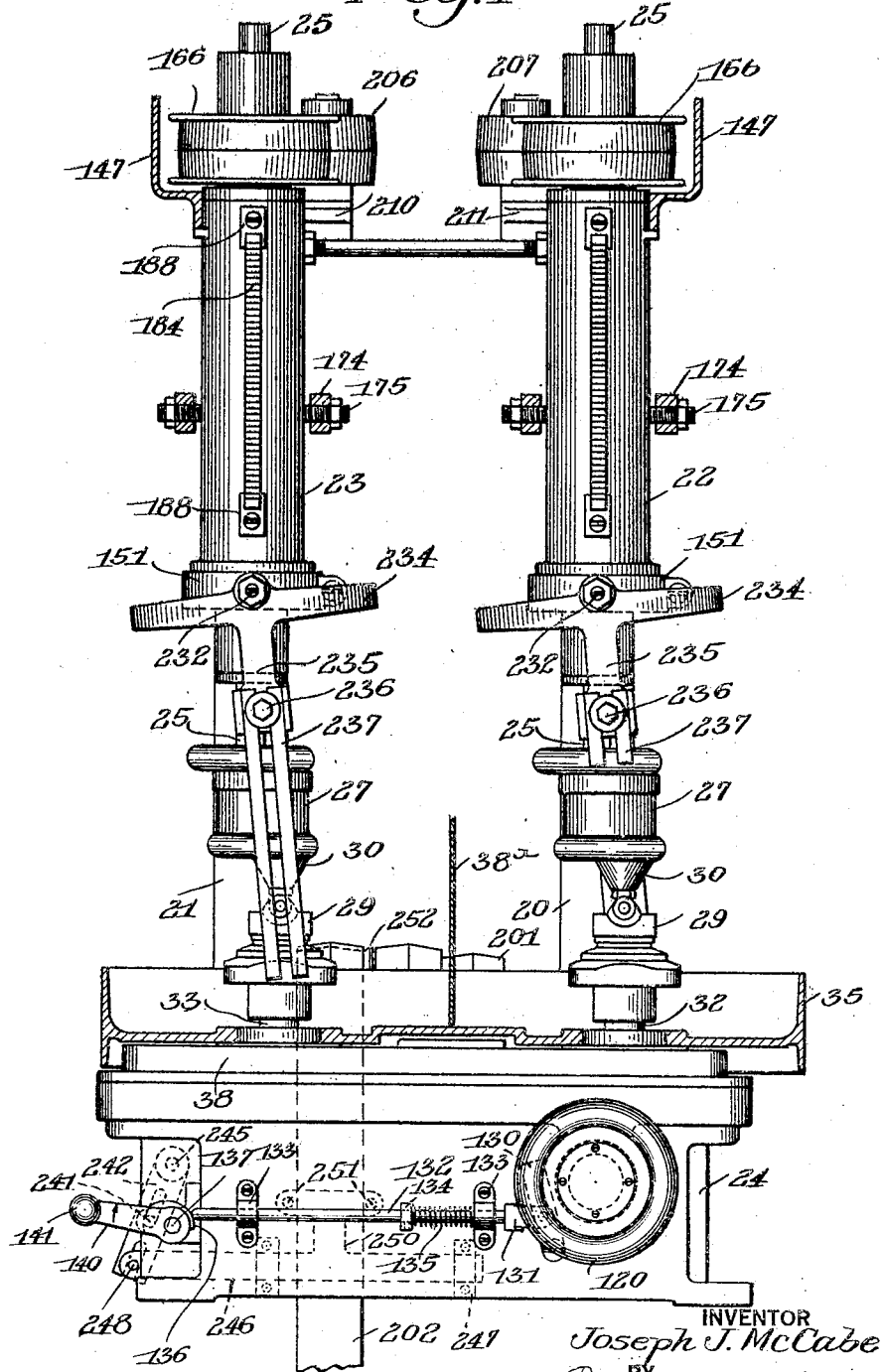

Referring now to Figures 1, 2, 3 and 4 of the drawings, there is shown a lens surfacing machine comprising the vertical frame members 20 and 21 provided with head members 22 and 23 and a common base 24. Spindles 25 are rotatably mounted in the head members 22 and 23 and form with the eccentrically mounted hub members 27 cranks which have pin members 30 forming depending crank arms. The pin members 30 are adapted to fit into recesses in the upper faces of lens blocks 29 in the usual manner and guide the lens blocks during the rotation of the spindle. Members 32 and 33 for supporting the tools are mounted on the slide 34 which forms part of the base. A tray member 35 provided with openings through which the lap members may pass is also rigidly mounted on the slide member 34 for movement therewith. The outer portions of the tray member are adapted to slide upon the felt member 36 mounted in a groove formed in an inwardly projecting member 38 mounted on the walls of the base.

The slide member 34 is mounted for movement transversely of the machine on a second slide member 37 which slides longitudinally of the machine upon inwardly projecting portions of the front and rear walls of the base 24. The slide member 37 comprises outwardly beveled side members 40 and 41 and inwardly beveled cross members 42. The side members 40 and 41 are adapted to rest upon the inwardly projecting portions 43 of the front and rear walls of the base 24 and to be confined to a straight line path of travel by the beveled guide members 44 which are also attached to the projecting portions 43. The slide member 34 has guide members 45 attached thereto for engagement with the beveled faces of the cross members 42. The above described construction permits the upper slide 34 and the lap members carried thereby to be moved in any direction thus permitting bodily rotation of the slide 34 and the lap supporting members while preventing rotation about their axes.

The mechanism for moving the slide 34 and thus moving the lap members is housed for the most part in the base in operative relation to a worm screw 46, the driving means for which will be later described. A crank comprising a circular disk 47 having an outwardly beveled outer edge portion, a concentric vertical downwardly extending arm 50, and an eccentric vertical upwardly extending arm 51 is mounted for rotation within the base 24. The arm 51 extends through an opening in the slide 34 and serves with other means to be presently described to actuate the slide member 34 and the lap members carried thereby.

The disc 47 may be described as being supported by a worm wheel 52 which has a depending outwardly beveled annular portion 53 which is mounted for rotation upon an upwardly projecting portion 54 of the bottom of the base 24. An inwardly beveled annular guide ring 55 is mounted on the portion 54 with its beveled face in contact with the beveled face of the depending portion 53. An internal gear 56 is formed integrally with the worm wheel 52 intermediate its ends, and the depending portion 53 is threaded internally for the reception of a threaded centrally bored disc 57 which has an annular row of clutch jaws 60 adjacent the opening therein.

An eccentrically bored hub member 61 having a wide annular shoulder 62 is mounted for rotation in the bore of the disc 57. The crank arm 50 is mounted for rotation in the bore of the hub member 61 and has a gear 63 keyed thereto and resting upon the upper face of the hub member 61. The teeth of the gear 63 are adapted to engage the teeth of a second gear 64 which is rotatably mounted on a pin 65 which is in turn mounted in the hub shoulder 62 and in the circular disk 66 which is interposed between the gears 64 and 63 and crank disc 47. The gear 64 is so positioned that its teeth also mesh with the teeth of the internal gear 56 so that movement of the internal gear 56 may, at appropriate times, be transmitted through the gear 64 to the gear 63 and the crank arm 51 may thus be set in motion. An annular guide ring 67 is attached to the disc 66 and has a beveled face in contact with the beveled face of the disk 47.

For the purpose of locking the hub member 61 to the worm wheel 52 for rotation therewith and for locking the hub member 61 against rotation a duplex clutch 70 and a stationary plate 71 having upwardly extending clutch jaws are provided. The clutch 70 comprises a sleeve which is slidably keyed to the hub 61 for reversible movement thereon and it is provided with an annular groove in which the inwardly projecting pivoted members 72 of the bifurcated clutch lever 73 are adapted to slide.

When the clutch 70 is in its upper position its upper jaws engage the jaws 60 and the hub member 61 is interlocked with and thus may rotate with the worm wheel 52. Since the internal gear 56 is formed integrally with or rigidly attached to the worm wheel 52 and rotates therewith, and since the gear 64 is mounted on a pin carried by the hub member 61, it must move bodily when the worm wheel is rotated. Consequently there can be no relative movement between the internal gear 56 and the gear 64, and therefore the gear 63, the teeth of which are in engagement with the teeth of the gear 64, cannot rotate and the crank arm 50 is thus locked against rotation.

During the normal operation of the machine the clutch is held in its upper position as just described. During the bodily movement of the crank arm 50 with the worm wheel 52 the crank arm 51 travels in a circular path. The mechanism described above may be operated to adjust the length of the radius of the said circular path and thus alter its path of travel. When the clutch 70 is moved to its lower position its upper jaws move out of engagement with the jaws 60 and its lower jaws engage the jaws of the stationary plate 71. The hub member 61 and its associated parts are thus held against rotation and the disc 57 is free to rotate with the worm wheel 52. During the rotation of the worm wheel 52, the gears 63 and 64 are held against bodily movement and the internal gear 56 causes rotation of the gear 64 which rotates the gear 63 and the crank arm 50, moving crank arm 51 through a circular path in a direction opposite to the direction of rotation of the worm wheel. The arrangement of the various parts is such that the crank arm 51 may be moved to a position in which its axis is in substantial coincidence with the axis of rotation of the worm wheel, and locked in such position.

An eccentrically bored sleeve 74 having a substantially centrally disposed circular flange collar 75 formed therewith or rigidly attached thereto is mounted on the crank arm 51 in such a manner as to permit rotation of the arm 51 therein. A bushing 76 is mounted on the sleeve 74 between the said sleeve 74 and the hub 77 of the slide 34 with its lower end in contact with the flange 75. The sleeve 74 is so mounted that it may be rotated relatively to the crank arm 51 and the hub 77. A circular internal rack 80 is rigidly attached to the outer edge portion of the flange 75. A second circular internal rack 81 is rigidly mounted on a depending circular hub 82 formed integrally with the slide 34. The two racks 80 and 81 have different numbers of teeth; as shown, the rack 80 has thirty teeth and the rack 81 has twenty-nine teeth.

Figure 8:
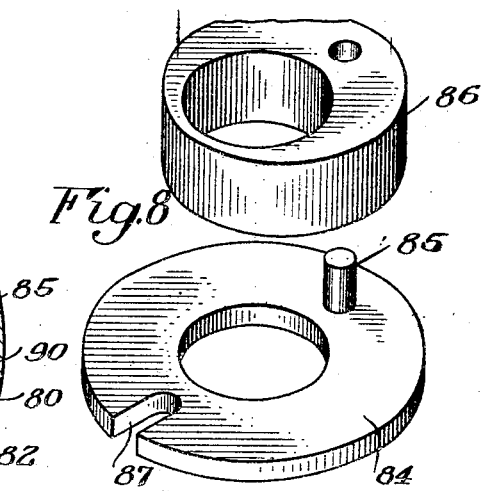

A pin member 83 is rigidly mounted upon and projects above the upper face of the disk 47 and is adapted to fit within an elongated peripheral slot 87 (Figure 8) in a disc 84 which rests upon the upper face of the disc 47 and is centrally bored for the passage therethrough of the sleeve 74. A pin member 85 is mounted on the disc 84 and projects above the upper surface thereof. An eccentrically bored sleeve 86 is mounted for rotation on the sleeve 74 and provided with a second bore of smaller size into which the pin 85 projects. The fit of the pin 85 in the smaller bore is such that the sleeve 86 may be rotated thereon. The ring gear 90 is mounted for rotation about the sleeve 86 and its teeth are adapted to simultaneously engage adjacent teeth of the circular racks 80 and 81.

The tray member 35 forms a covering for the base and serves to protect the mechanism contained therein from abrasive and other materials used in treating the lenses. The tray 35 is provided with upwardly extending side and end walls and a depending flange or apron which in conjunction with the continuous felt ridge 36 serves to prevent foreign materials from passing beneath the tray to the operating mechanism. A partition 38a positioned intermediate the lap members serves to confine abrasive and other materials to the particular side of the apparatus on which they are intended to be used. The bases of the lap members 32 and 33 as shown are circular in cross section and they fit closely within the circular apertures formed in the floor of the tray 35. Such a construction prevents abrasive materials from working downwardly to the operating mechanism and permits the tray to aid the bolts by means of which the lap members are attached to the slide 34 in holding the lap members rigidly in position.

Figure 7:
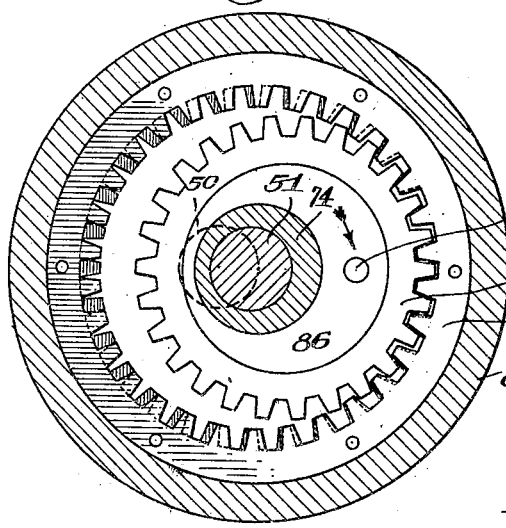
Figures 7 and 8 show portions of the lap actuating mechanism and the means for changing the curvature of the path of travel of the lap.
Figure 6:
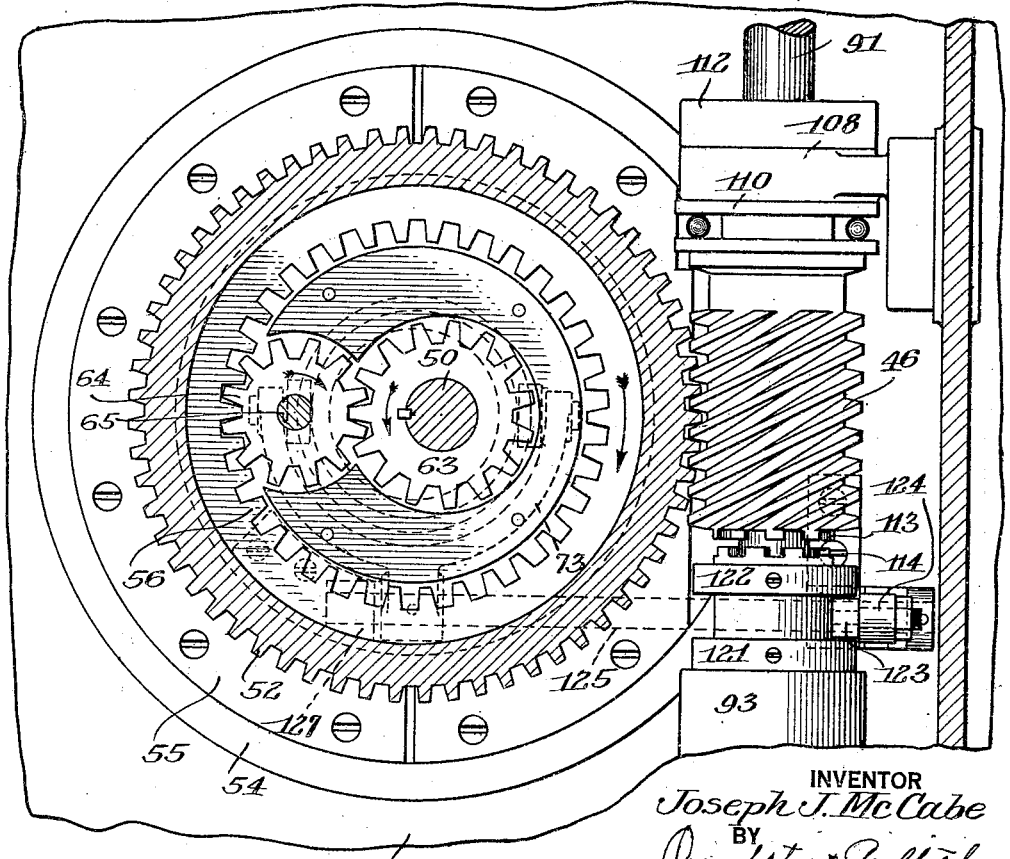
Figure 6 is a sectional plan view showing the mechanism for altering the path of travel of the lap members.

As pointed out above the lap actuating mechanism is operated through a worm screw 46. When the clutch 70 is in its upper position and the worm 46 is turned in the direction indicated by the arrow in Figure 4, the mechanism contained within the worm wheel rotates as a rigid mass about the axis of the hub 61 in the direction indicated by the arrow on the internal gear in Figure 6. The crank arm 51 also moves in a circular path about the axis of the hub 61 and tends to move all points in the slide 34 carrying the tray 35 and supporting members 32 and 33 through similar paths. The paths of the points on the slide 34 and consequently the paths of the center points of the lap supporting members are, however, varied by the action of the ring gear 90 on the circular racks 80 and 81. The disc 84 having two points of connection with the disc 47, that is, a sliding pivotal connection through the pin 83 and slot 87 and a pivotal connection through its central bore and the sleeve 76 and crank arm 51 also rotates bodily about the axis of the hub 61. The cam sleeve 86 having pivotal connection with the disc 84 through the pin 85 and further pivotal connection with the moving mass through its large bore and the sleeve 76 and crank arm 51 is rotated in the same manner and in the direction indicated by the arrow above the pin 85 in Figure 7. The ring gear 90, being mounted on the cam sleeve 86 is thus constrained to move with it, but, since its teeth engage the teeth of the circular racks 80 and 81, it is also caused to rotate about the axis of the cam sleeve 86. As the circular rack 80 is rigidly mounted on the cam sleeve 74 and may rotate therewith and the circular rack 81 is rigidly mounted on the slide 34 which controls the movement of the laps, and as the rack 80 has a greater number of teeth than the rack 81, the ring gear 90 for each revolution of the worm wheel 52 will cause the rack 80 to move relatively to the rack 81 in substantially the direction of rotation of the worm wheel. Thus for each revolution of the worm wheel the cam sleeve 74 is rotated a fraction of a turn about the crank arm 51. The relative positions of points on the laps with respect to points on the cam sleeve 74 are thus constantly changing, and, as the positions of the laps with respect to the axis of the crank arm 51 are determined by the angular position of the crank sleeve 74, since the said crank sleeve is positioned between the arm 51, and the slide upon which the laps are rigidly mounted, the positions of the laps with respect to the axis of the crank arm 51 are constantly changing. Therefore, while the axis of the arm 51, for any set position of the arm 51 with respect to the axis of the hub 61, travels in a fixed circular path, the paths of travel of the laps are constantly changing. Furthermore the throw of the crank means which controls the travel of the lap members is constantly changing by reason of the rotation of the eccentric members 74, consequently, the speed of the laps is constantly changing. In connection with the rotation of the cam sleeve 74 it may be noted that it is important that a sliding connection between the pin 83 and disc 84 be provided as the position of the center of the cam sleeve 74 is constantly shifting which causes a shifting of the center of the cam sleeve 86 and movement of the pin 85 toward and away from the axis of the crank arm 51.

The worm screw 46 is splined for relative sliding movement on a horizontal shaft 91. One end of the shaft 91 is journaled for rotation in a sleeve 92 which is in turn mounted for sliding and rotational movement in a bearing 93 in the front wall of the base 24. The other end of the shaft 91 is journaled for sliding and rotational movement in a bushing 94 which is in turn rigidly mounted in a bearing 95 in the rear wall of the base 24 and projects rearwardly to provide a bearing surface for a spiral gear 96 which is operated by a spiral gear 97. The hub of the spiral gear 96 bears against the end of the bearing 95, and rings 100 of suitable bearing metal are provided between the two adjacent surfaces.

The spiral gear 96 is confined to its operating position on the sleeve 94 by means of a collar 101 which is held in position on the sleeve 94 by means of a set screw 102. The spiral gear 96 is provided adjacent its outer end with an annular row of clutch jaws 103 which are adapted to cooperate with the annular row of clutch jaws 104 carried by the clutch member 105 which is rigidly mounted on the end of the shaft 91.

The worm screw 46 is provided with a shoulder portion 106 and a reduced end portion 107 which extends through a bore in a stationary projecting arm 108 which is mounted on a wall of the base 24. A thrust bearing 110 is positioned between the shoulder 106 and the arm 108 to take the thrust of worm 46 as it rotates to operate the worm wheel 52. For the purpose of maintaining the worm 46 in its proper operating position and preventing longitudinal movement thereof when the shaft 91 is moved forwardly and rearwardly, the outer end of the reduced end portion 107 is threaded and a threaded nut or collar 112 is mounted thereon in abutting relation to the arm 108. The collar is so positioned on the worm that the thrust bearing 110 is drawn substantially into contact with the shoulder 106 and the arm 108. The worm is thus permitted to rotate while forward or rearward movement due to the thrust of the worm wheel 52 or the movement of the shaft 91 is prevented.

The other end of the worm 46 is provided with an annular row of clutch jaws 113 which are adapted in certain instances to cooperate with a similar annular row of clutch jaws 114 carried by the sleeve 92. As has been pointed out above the shaft 91 is rotatably mounted in the sleeve 92 and the sleeve 92 is slidably and rotatably mounted in the bearing 93. To prevent sliding movement of the shaft 91 relatively to the sleeve 92 and to permit the shaft 91 and sleeve 92 to be moved forwardly and rearwardly in unison, set screws 115 extend through the sleeve 92 into apertures in slide members 116 which are slidably mounted in an annular groove 117 formed in the shaft 91 adjacent its end. Rotation of the shaft 91 relatively to the sleeve 92 is thus permitted while relative longitudinal sliding movement is prevented.

To facilitate the sliding and turning movement of the sleeve 92 a handwheel 120 is mounted on the end of the said sleeve and held in position by means of the set screws 115. Spaced collars 121 and 122 are rigidly mounted on the sleeve 92 to form a guideway for a slide member 123 which is pivotally mounted on the upper end of a lever arm 124. The other end of the lever arm 124 is rigidly attached to an end portion of a rod 125 which is pivotally mounted in a bracket 126 adjacent an end of the base 24 and in a second bracket 127 (Figure 6) adjacent the center of the base. The rod 125 also has the bifurcated clutch lever 73 rigidly mounted thereon for movement therewith. The angular relationship of the two levers 124 and 73 is such that when the sleeve 92 is moved to its outermost position the simultaneous movement of the lever arm 124 rotates the rod 125 and moves the lever arm 73 sufficiently to cause the upper clutch jaws of the member 70 to operatively engage the clutch jaws 60 on the disc 57 as shown in Figure 10. Also the position of the stationary clutch plate 71 is such that when the sleeve 92 is in its innermost position the clutch jaws of the said clutch plate are engaged by the lower clutch jaws of the member 70 as shown in Figure 11.

When the sleeve member 92 and handwheel 120 are in their outermost positions the shaft 91 also occupies its outermost position and the clutch jaws 104 of the clutch member 105 are in engagement with the in the spindle, permitting sliding movement of the spindle relatively to the pulley.

A tray 170 is mounted on the lower end of the spindle for rotation therewith to protect the lens and tool from lubricants and other foreign substances which may fall from the head member. The hub member or lever arm 27 is eccentrically mounted on the lower end of the spindle and the eccentrically mounted pin 30 projects downwardly therefrom for guiding the lens block.

The spindle and the casing carried thereby may be moved to adjust the position of the pin 30 by means of a handle 173 which is attached to oppositely disposed lever arm 174. (Figure 2.) Set screws 175 having tapered end portions are mounted on the lever arms 174 intermediate their ends and project through longitudinally extending slots 176 in the shell 145 into tapered recesses in the tubular member 154. The set screws 175 are locked in position on the lever arms by means of lock nuts 177.

The lever arms 174 extend from front to rear of the head member on opposite sides thereof and have their adjacent ends joined, forming substantially a continuous band. A rod 180 which is rigidly attached to the lever arms 174 and extends rearwardly therefrom is seated for sliding movement in bearing 181 which is pivotally mounted on a bracket 182 formed integrally with or rigidly mounted on the frame. The handle 173 projects forwardly of the head member and has a latch member 183 of usual construction mounted thereon and carrying a dog which engages the teeth of the arcuate ratchet member 184 and normally prevents upward movement of the spindle except against the springs 161 and 162. The construction of the latching means is such that the spindle is not locked against downward movement when pressure is applied downwardly on the handle, and by moving the lever indicated by the numeral 183 toward the handle the dog is moved out of contact with the ratchet member and the spindle may be raised. The ratchet member 184 extends vertically and is rigidly mounted in brackets 188 on the front of the shell 145.

The hub member or lever arm 27 is so constructed that the throw of the pin 30 may be adjusted. The structure of the said member is clearly shown in Figures 12, 13, 14 and 15. A central cylindrical block member 185 is provided with an eccentric bore in one plane face for the reception of the reduced end of the spindle. A pin 186 extends through a transverse slot in the block and a slot in the reduced end of the spindle and provides the means for fixing the hub member on the spindle. Spring plungers 187 are mounted in bores in the block member on opposite sides of its center, and their ends are adapted to be normally held a considerable distance above the upper surface of the block member. A clutch disc 190 provided with a semi-circular slot 191 and having an annular row of clutch jaws 192 mounted on its lower face is rigidly attached to the lower plane face of the block member. A second clutch disc 193 having an annular row of clutch jaws 194 is rigidly mounted within a cup or casing member 195 and has a pin 196 projecting upwardly therefrom into the slot 191. The upper end of the member 195 which is externally threaded is screwed into an internally threaded collar 197 which has an inwardly extending annular shoulder portion resting upon the extended ends of the spring plungers 187. The pin 30 is mounted eccentrically on the lower face of the member 195 and projects downwardly therefrom. The axis of the pin in the assembled hub member is spaced from the axis of the block member 185 a distance substantially equal to the distance of the axis of the spindle from the axis of the block member. The center of curvature of the slot 191 coincides with the axis of the block member and the radius of the center line of the slot is equal to the distance of the axes of the spindle and pin 30 from the axis of the block member. The disc 190 is so positioned on the block member 185 that an end of the slot 191 is positioned beneath the center of the spindle, and the disc 193 is so mounted on the member 195 that the axes of the pins 196 and 30 are in substantial coincidence. Accordingly, the member 195 may be rotated on the block member 185 from a position in which the distance between the axes of the spindle and pin 30 is equal to twice the distance between the axis of the spindle and the axis of the block member to a position in which the axes of the spindle and pin 30 substantially coincide.

To adjust the position of the pin 30 with respect to the spindle and thus adjust the path of travel of the lens block, the member 195 may be grasped at the projecting ridge portion near the bottom and downward pressure exerted. The shoulder portion of the collar 197 will compress the spring plungers 187 permitting the member 195 to move downwardly to move the clutch jaws 194 out of engagement with the clutch jaws 192. The member 195 may then be rotated the desired amount and released and the plungers 187 will return the member 195 to its normal operative position with the clutch jaws 192 and 194 in engagement. The pin member 196 and slot 191 permit the rotation of the member 195 through substantially 180° and serve as stop members to indicate that the axis of the pin 30 is in coincidence with the axis of the spindle or displaced the clutch jaws 103 of the spiral gear 96 and the shaft 91 may be rotated by the spiral gear 97. In such a case, since the worm screw 46 is held against translational movement by the stationary arm 108 and thrust bearing 110 and collar 112, the clutch jaws 114 carried by the sleeve 92 are out of engagement with the clutch jaws 113. The lever arms 124 and 73 occupy the relative positions shown in Figure 10 and the clutch jaws 60 are engaged by upper clutch jaws of the member 70. The crank arm 50 is thus locked against rotation about its own axis as previously described. Movement of the driving spiral gear 97 may thus be transmitted through the shaft 91, worm screw 46, worm wheel 52 and crank arm 51 to the lap members.

When the sleeve member 92 and shaft 91 are moved from their outermost positions to their innermost positions, the clutch jaws 104 and the upper clutch jaws of the clutch member 70 are moved out of engagement with the clutch jaws 103 and 60 respectively. At the same time clutch jaws 114 are caused to operatively engage the clutch jaws 113 and the lower clutch jaws of the clutch member 70 engage the clutch jaws of the stationary disc 71. As explained above the worm screw 46 remains in an operative position relatively to the worm wheel 52 and accordingly the handwheel 120 may be operated to rotate the worm wheel 52 through the sleeve 92 and worm screw 46, thus causing relative movement of internal gear 56 and spur gear 64 and relative movement of the crank arm 51 and the axis of the hub member 61 to alter the paths of travel of the lap members.

For the purpose of locking the sleeve 92 and shaft 91 in their outermost positions and thus locking the parts in their operative positions, a pivoted latch 130 of sufficient thickness to fit between the hub of the handwheel 120 and the front wall of the base is provided. (Figures 5 and 9.) The latch 130 is in the form of a metal strap and it is pivotally attached adjacent one end to the front wall of the base and intermediate its ends to a bifurcated sleeve member 131 which is mounted on an end of a horizontal rod 132. The rod 132 is mounted for sliding movement in brackets 133 on the front wall of the base. A collar 134 is rigidly mounted on the rod 132 and a helical spring 135 is mounted on the rod under compression between the collar 134 and a bracket 133 and tends to hold the latch 130 normally in an inoperative position or out of engagement with the sleeve 92. The rod is moved for the purpose of operating the latch 130 by means of a cam 136 which is rigidly mounted on an end of a rod 137 which is pivotally mounted on and projects beyond the front and rear walls of the base 24. A lever arm 140 and handle 141 are rigidly attached to the cam 136 and rod 137 for rotating the same. As may be readily seen, when the handle 141 is moved in the direction indicated by the arrow in Figure 1, the cam 136 operates to slide the rod 132 in the direction of the sleeve 92 and thus move the latch 130 into position between the hub of the handwheel 120 and the front wall of the base. The shape and size of the cam and the arrangement of parts adjacent the other end of rod 137 is such that when the cam has been rotated through substantially 180° it automatically locks the latch 130 in its operative position as shown in Figure 9.

The head members 22 and 23 are substantially identical in structure. Each head member comprises an outer cylindrical shell 145 which may be formed integrally with or may be rigidly attached to the frame members 20 and 21. Each shell is provided with an integral projection 146 for aiding in supporting a belt guard 147 and an integral annular shoulder 150 for aiding in positioning a clamping member 151 which supports lens block guiding means to be later described.

A spindle 25 is slidably and rotatably mounted in the shell 145. A sleeve member 153, having a flange collar at its lower end which is attached to the wall of the shell, forms an upper bearing for the spindle. The lower bearing for the spindle is in the form of an enclosed casing which is mounted on the spindle for sliding movement therewith and which is adapted to slide within the shell 145 with its outer face in contact with the inner face of the shell wall.

The casing comprises a substantially tubular member 154 having a centrally bored bushing 155 mounted in one end, and a centrally bored spring seating collar 156 and a locking collar 157 threaded into the other end. A second centrally bored spring seating collar 160 is mounted for sliding movement within the shell with its seating surface facing the seating surface of the collar 156. Telescoping helical springs 161 and 162 of different strengths are mounted between the collars 156 and 160. A bearing collar 163 is rigidly mounted on the spindle by means of pin 164. When the assembled casing is mounted on the spindle, the collar 163 is positioned within the casing between bushing 155 and the collar 160 and ball bearings 165 are positioned between the collars 160 and 163. The springs 161 and 162 are of such strength that the bushing 155 is normally held in contact with the collar 164.

A belt channel-faced pulley 166 is splined to the upper end of the spindle 25 and sleeved over the member 153 for rotation thereon. A key 167 is fixed in the hub of the pulley 166 and extends into an elongated slot maximum distance from the axis of the spindle.

The driving means for the spindle mechanism and lap actuating mechanism comprises a shaft 200 mounted on suitable bearings in the bottom portion of the frame members 20 and 21 which are supported on the rear wall of the base and have the spiral gear 97 and a duplex pulley 201 rigidly mounted thereon. (Figures 17 and 18.) As shown in Figures 2, 3, and 9, a drive belt 202 having connection with any suitable source of power is mounted on the larger side of the duplex pulley 201 and serves to rotate the shaft 200 and thereby operate the lap actuating mechanism through the spiral gears 96 and 97. For the purpose of rotating the spindles in the two head members, a second belt 203 is mounted on the smaller side of the duplex pulley 201 and conducted upwardly over the idle pulleys 204 and 205, and from them it passes between the idle pulleys 206 and 207 and partially around these pulleys, extending thence around both of the spindle driving pulleys 166. Both spindles will thus be rotated in the same direction. The pulleys 206 and 207 are mounted on brackets 210 and 211 positioned on the head members and projecting inwardly toward the center of the machine. The pulleys 204 and 205 are mounted for rotation on shafts 212 and 213 supported in bosses 214 and 215 formed in a casting 216. The arm 217 of the casting 216 projects upwardly and supports the upper portion of the pulley 204 above the upper portion of the pulley 205 to provide clearance for the belt. The pulley 205 rotates about a horizontal axis which is angularly disposed with respect to the axis of the shaft 200 and guides the belt to the spindle pulley which is spaced farthest from the drive pulley 201.

The casting 216 is provided with a vertical side face 220 having a projecting guide portion 221 which is adapted to slide in a groove 222 formed in a face of the supporting bracket 223. The bracket 223 is provided with a horizontal slot 224 through which a threaded bolt 225 may project into a threaded slot in the guide 221 for locking the casting 216 in position on the bracket 223. The tension of the driving belt may be adjusted by adjusting the position of the casting 216 on the bracket 223 and thus moving the pulleys 204 and 205.

For use in grinding lenses such as toric and cylinder lenses in which it is necessary to maintain the axis of the lens parallel to the axis of the tool, guiding means are suspended from the clamp member 151 previously described. The clamp 151 is provided with oppositely disposed bosses 230 in which suitable recessed bearing members 231 are mounted. Set screws 232 having tapered end portions are threaded through oppositely disposed bosses 233 in a ring member 234 and have their tapered ends positioned in the recesses of the bearing members 231 to provide a sensitive pivotal connection for the ring member. Oppositely disposed leg members 235 having wall members forming channels adjacent their ends and threaded central bores or openings in the channels are formed integrally with and depend from the ring member. Metal strips 237 of sufficient width to form a close fit between a bolt 236 extending through the opening in the bottom wall of the channel and a side wall of the channel are positioned in the channels on opposite sides of the bolts 236, and held against movement by the bolt and the side walls of the channels. The strips 237 form forks between the prongs of which the outwardly projecting arms of a lens block may extend. Since the head members are stationary, the ring members can move only about a fixed horizontal axis. Consequently, there can be no rotation of the lens block and no shifting of the axis of the lens in a horizontal plane.

Before disengaging the lap mechanism from the driving means for the purpose of adjusting the travel of the lap, it is desirable that the driving means be disconnected from its source of power and to this end there is provided means for simultaneously disconnecting the machine and removing the latch member 130 to permit adjustment of the lap mechanism. As previously pointed out, the lever 140 and cam 136 for shifting the rod 132 and locking the lap controlling mechanism in its operative position are fixedly mounted on a rotatably mounted rod 137 which projects beyond the front and rear walls of the base. A lever arm 240 carrying a rearwardly projecting pin 241 is rigidly mounted on the rear end of the shaft 137 with its free end extending from the shaft in subtantially the same direction as the lever arm 140. A second lever arm 242 provided with longitudinal slots 243 and 244 is pivoted adjacent an end to the rear wall of the base at 245. The pin 241 projects into the slot 243 and shifts the lower end of the lever arm 242 toward and from the driving pulley when the shaft 137 is rotated by means of the handle 141 (Figures 1, 5, 9, 17 and 18). The length of the slot 243 is such that when the lever arm 242 is in either of its extreme positions the pin member 241 rests on the bottom of the slot, holding the lever arms 240 and 140 in substantially horizontal positions and locking the lever arm 242 against movement by forces applied laterally. The lever arm 242 is operatively connected through a pin 248 projecting into slot 244 to a rod member 246 which is slidably mounted in brackets 247 on the rear wall of the base 24. An arm 250 carrying spaced rearwardly projecting arms 251 is mounted on the rod 246 and extends upwardly to a position below the driving pulley. The arms 251 are spaced apart sufficiently that the drive belt may pass freely between them. A loose pulley 252 is mounted on a bushing 253 in which the shaft 200 is rotatably mounted. The arm 250 is so positioned on the rod 246 and the lengths of the various lever arms are such that when the lever 242 is in its extreme position away from the driving pulley a belt mounted on the loose pulley 252 can pass freely between the arms 251, and when the lever 242 is in its other extreme position a belt mounted on the larger side of the duplex pulley 201 can pass freely between the arms 251. It will thus be seen that if a belt is mounted on either the driving pulley or the loose pulley it may be shifted to the other by means of the lever 242 through the handle 141 at the front of the machine.

When it is desired to use the machine the handle 141 should be in the position shown for example in Figures 1, 5, and 17, in which case the driving belt 202 will be positioned on the loose pulley and the latch 130 will be in its retracted position. The power may then be turned on without in any way affecting the operating mechanism of the machine. As pointed out above, the lever 242 is locked against forces applied laterally and the belt is thus locked against movement in either direction away from the loose pulley. It is thus impossible for the machine to be accidentally operated. Likewise when the belt is on the driving pulley it is locked against lateral displacement and the machine cannot be accidentally thrown out of operation. Furthermore, unless the shaft 91 and sleeve 92 are in their outermost positions the latch 130 will engage the hub of the handwheel 120, locking the handle 141 against movement and thereby preventing shifting of the belt to operate the machine.

With the belt running on the loose pulley as explained above and the latch 130 retracted, the path of travel of the lap may be adjusted by manipulating the sleeve 92 and shaft 91 as explained. The paths of travel of the pins 30 may also be adjusted at this time in the manner described. Proper tools may then be mounted on the lap members and the spindles moved downwardly until the pins 30 are seated in the recesses of lens blocks applied to the tools, after which the proper pressure may be applied to the lens blocks by moving the handle 173 downwardly and locking it in position by means of the ratchet member 184 and latch 183 as previously described.

When proper adjustments have been made and the shaft 91 is moved to its outermost position, the machine is ready for operation. The handle 141 may then be moved to the position shown in Figure 9, whereupon the machine is started and the latch 130 is moved to its position between the hub of the handwheel 120 and the front wall of the base to prevent accidental displacement of the sleeve 92 and shaft 91.

In connection with the operation of the machine it may be noted that the head structure provides for putting uniform pressures on the lens blocks for all normal operating positions of the spindle since, as pointed out, the spring members are mounted on the spindle and the relative positions of the spring members and spindle are always the same regardless of the position of the spindle in the head member.

The paths of travel of the lens blocks relatively to a fixed point are uniform for any one operation and as the paths of travel of the lap members are constantly changing, the paths of travel of the lens blocks relatively to the lap members will be constantly changing. Consequently there is little likelihood of grooves being cut in the lens surfaces and thoroughly efficient grinding or polishing operations are assured.

The provision of two spindles actuated by a single drive belt and two lap members controlled by a single actuating mechanism permits identical results to be obtained on two lenses simultaneously.

From the foregoing it will be seen that there is herein provided an apparatus which embodies the features of this invention and achieves the objects thereof including many practical advantages. A lens surfacing and grinding machine is provided which is dependable in operation and by means of which lenses may be thoroughly and efficiently ground and polished in a minimum of time.

As many possible embodiments may be made of the above invention, and as many changes might be made in the embodiment above set forth, it is to be understood that all matter hereinbefore set forth or shown in the accompanying drawings is to be interpreted as illustrative and not in a limiting sense.

I claim as my invention:

1. In a machine of the class described, the combination with a lens block and a tool adapted to cooperate therewith, of means for bodily rotating said lens block, crank means for moving said tool in a curved path, means for operating said crank means at a constant rate of speed, and means for constantly changing the throw of said crank means to vary the speed of movement of said tool.

2. In a machine of the class described, the combination with a lens block and a tool adapted to cooperate therewith, of means for bodily rotating said lens block, means for moving said tool through a curved path, and means for constantly changing the curvature of said path.

3. In a machine of the class described, the combination with a lens block and a tool adapted to cooperate therewith, of means for bodily rotating said block, means for moving said tool through a curved path, means for constantly changing the curvature of said path, and means for altering the position of said path.

4. In a machine of the class described, the combination with a lens block and a tool adapted to cooperate therewith, of means for bodily rotating said lens block, crank means for moving said tool through a cycloidal curved path, and manually controlled means for changing the throw of said crank means to alter the path of travel of said tool.

5. In a machine of the class described, the combination with a lens block and a tool adapted to cooperate therewith, of adjustable crank means for bodily rotating said lens block, and means for moving said tool in a cycloidal curved path.

6. In a machine of the class described, the combination with a lens block and a tool adapted to cooperate therewith, of means for bodily moving said lens block, crank means for moving said tool through a curved path, and cam means for automatically changing the throw of said crank means to vary the path of travel of said tool.

7. In a machine of the class described, adjustable lap actuating mechanism having a part movable to a plurality of different positions, and means effective to operate said mechanism when said part is in one of its said positions, said means being effective to adjust said mechanism when said part is in another of its said positions.

8. In a machine of the class described, adjustable lap moving mechanism, means for locking said mechanism in one of a plurality of adjusting positions, driving means for said mechanism, means engaging said driving means to operate said mechanism, and means for unlocking said mechanism, disengaging said driving means from said operating means, and for manipulating said driving means to adjust said mechanism.

9. In apparatus of the class described, lap actuating mechanism comprising a rotatable support, a rotatable crank eccentrically mounted on said support, means for rotating said support, means for locking said crank against bodily rotation with said support, and means actuated by said support for rotating said crank relative to said support.

10. In a machine of the class described, a worm wheel mounted for rotation about a vertical axis, a crank having an arm mounted for rotation on said worm wheel, and means for locking said crank arm against bodily rotation with said worm wheel while permitting rotation of the worm wheel relative to said crank arm to adjust the position of the crank with respect to the worm wheel.

11. In a machine of the class described, a worm wheel mounted for rotation about a vertical axis, a crank having an arm eccentrically mounted on said wheel for rotation about a vertical axis, means for locking said arm against rotation about its axis while permitting rotation of said worm wheel and bodily rotation of the crank therewith, and means for releasing said crank to permit rotation about its axis and for holding it against bodily rotation while permitting rotation of the worm wheel.

12. In apparatus of the class described, a rotatable support, a crank mounted for rotation on said support, means mounted on said support for rotating said crank, means for locking said crank in position on said support for bodily rotation therewith, means for rotating said support, power driven means for operating said support-rotating means, and means for rendering inoperative said power driven means, releasing said crank locking means, holding said crank against bodily rotation with said support, and operating said support-rotating means to rotate said crank.

13. In apparatus of the class described, a rotatable support, a rotatable crank eccentrically mounted on said support, means operable by said support for rotating said crank, means for locking said crank in position on said support for bodily rotation therewith, means for rotating said support, power driven means for operating said support-rotating means, and means for rendering inoperative said power driven means, releasing said crank locking means, holding said crank against bodily rotation with said support, and operating said support-rotating means to rotate said crank.

14. In apparatus of the class described, a rotatable support, means for rotating said support, power driven means for operating said support-rotating means, a rotatable crank eccentrically mounted on said support, means for holding said crank against bodily rotation with said support, means for rotating said crank when said crank is held against bodily rotation, means for locking said crank on said support for rotation therewith, and manually controlled means for selectively rendering operative said power driven means, and said crank locking means or said crank holding means and said crank rotating means.

15. In apparatus of the class described, a rotatably mounted worm wheel, an internal gear rigidly mounted on said worm wheel, crank means eccentrically mounted on said worm wheel, gear means engaging said internal gear and operatively connected to the crank for rotating said crank means, means for locking said gear means and said internal gear against relative movement for locking the crank against rotation with respect to said worm wheel, means for rotating said worm wheel, power driven means for operating said worm wheel rotating means, and manually operated means for controlling the operation of said gear locking means and said power driven means and for rotating said worm wheel.

16. A spindle attachment for lens surfacing machines comprising a cylindrical block, clutch jaws mounted on one plane face of said block, a circular disc having clutch jaws mounted on one face and a pin member eccentrically mounted on the opposite face adjustably mounted on said block, and means for holding the clutch jaws on the disc in engagement with the clutch jaws on the block.

17. In a grinding apparatus, a rotatable member, a sleeve rotatably mounted on said rotatable member, a crank having one arm rotatably mounted in said sleeve and a second arm offset from said first arm, means for locking said sleeve to said rotatable member, and means connecting said crank to said rotatable member, said connecting means serving to hold said crank in fixed relation to said rotatable member when said sleeve is locked to said rotatable member, and also serving to adjust said crank relative to said rotatable member when said rotatable member and sleeve are moved relative to each other.

18. In a grinding apparatus, the combination with a movable tool supporting member, of a rotatable crank arm, an eccentric sleeve rotatably mounted on said crank arm and engaging said tool supporting member, and differential gearing cooperating with said sleeve for turning said sleeve a fraction of a revolution about its own axis for each revolution of said crank arm, whereby to vary the path of the travel imparted to said tool supporting member by said crank arm.

19. In a grinding machine, the combination with a movable tool supporting member, of a rotatable crank arm, an eccentric sleeve rotatably mounted on said crank arm and engaging said tool supporting member, a gear mounted on said sleeve, a second gear having a different number of teeth from said first gear mounted on said tool supporting member, and a pinion cooperating with both of said gears to turn said sleeve a fraction of a revolution about its own axis for each revolution of said crank arm, whereby to vary the path of the travel imparted to said tool supporting member by said crank arm.

JOSEPH J. McCABE.